United States Patent
Almy et al.

(10) Patent No.: US 11,814,812 B2
(45) Date of Patent: *Nov. 14, 2023

(54) SYSTEMS, METHODS AND MACHINES FOR ALIGNING AND ASSEMBLING SINGLE-AXIS TRACKER FOUNDATIONS

(71) Applicant: Ojjo, Inc., San Rafael, CA (US)

(72) Inventors: Charles Almy, Berkeley, CA (US); Tyrus Hudson, Petaluma, CA (US); Jack West, San Rafael, CA (US); Tim Woodward, Arcata, CA (US)

(73) Assignee: Ojjo, Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,489

(22) Filed: Jul. 20, 2022

(65) Prior Publication Data

US 2022/0356667 A1     Nov. 10, 2022

Related U.S. Application Data

(63) Continuation of application No. 16/835,256, filed on Mar. 30, 2020, now Pat. No. 11,479,938.

(60) Provisional application No. 62/826,844, filed on Mar. 29, 2019.

(51) Int. Cl.
*E02D 7/22* (2006.01)
*E02D 5/56* (2006.01)
*E02D 13/00* (2006.01)

(52) U.S. Cl.
CPC ............... *E02D 7/22* (2013.01); *E02D 5/56* (2013.01); *E02D 13/00* (2013.01)

(58) Field of Classification Search
CPC ............. E02D 7/22; E02D 5/56; E02D 13/00
See application file for complete search history.

(56) References Cited

U.S. PATENT DOCUMENTS 9,194,184 B2 * 11/2015 Flusche ................ E21B 19/20
11,479,938 B2 * 10/2022 Almy ..................... E02D 7/22

* cited by examiner

*Primary Examiner* — Sean D Andrish
(74) *Attorney, Agent, or Firm* — Phillip D. Mancini

(57) ABSTRACT

An automated control system for a screw anchor driving and truss assembly machine. A positioning subsystem determines an orientation of a machine mast's driving axis relative to an intended drive axis and controls the mast to be positioned so that the mast's driving axis is aligned with the intended drive axis of the screw anchor foundation component. After a pair of adjacent screw anchors are driven, the controller causes motion controllers to orient the mast so that an alignment jig for supporting truss apex hardware is held in place relative to the driven screw anchors at a predetermined point in space above them so that upper leg sections can be sleeved over connecting portions of the apex hardware and down on to the driven screw anchors.

13 Claims, 10 Drawing Sheets

SYSTEMS, METHODS AND MACHINES FOR ALIGNING AND ASSEMBLING SINGLE-AXIS TRACKER FOUNDATIONS

CROSS-REFERENCE TO RELATED APPLICATIONS

This is a continuation of U.S. utility patent application Ser. No. 16/835,256, filed on Mar. 30, 2020, titled, "Systems, methods and machines for aligning and assembling truss foundations," now U.S. Pat. No. 11,479,938, which, claims priority to U.S. provisional patent application No. 62/826,844 filed on Mar. 29, 2019, titled, "Automated work point alignment for anchored A-frame foundations and related systems and methods," the disclosure of which are all hereby incorporated by reference in their entirety.

BACKGROUND

The applicant of this disclosure has invented a novel foundation system for single-axis trackers and other structures to replace conventional monopile foundations. Known commercially as EARTH TRUSS, this system replaces H-piles with moderately sloped A-frame-shaped trusses. Each A-frame-shaped truss is formed from a pair of adjacent tubular screw anchors driven into the ground at angles to one another on either side of a North-South oriented tracker row. An upper leg is coupled to the end of each screw anchor, and an adapter, bearing adapter, or truss cap joins the free ends of each upper leg to complete the truss. One advantage of the A-frame geometry over conventional monopiles is that for foundations that support non-moment connections, the A-frame takes the foundation out of bending and instead subjects it to axial forces of tension and compression. Single structural members are very good at resisting such forces relative to their ability to resist bending, therefore much smaller, tubular members may be used to make up the truss leg. Also, because axial forces dominate, the legs can be driven to shallower embedment depths. The net result is that by using a truss foundation the tracker can be supported with less steel.

One reason that monopiles have dominated the market for single-axis tracker foundations is their simplicity. Even though they are inherently wasteful, it is relatively easy to install rows of plumb-drive monopiles. By contrast, assembling a truss foundation requires specialized machines that can drive a pair of adjacent anchors at non-plumb angles. It also requires the assembly of two-piece legs that are interconnected with apex hardware that must be aligned with respect to the site plan and to other truss foundations in the same row. Therefore, in order to maximize the competitiveness of truss foundations relative to monopiles, automated machine control techniques must be used to assist an operator in aligning, installing, and assembling truss foundations so that installation complexity does not erode the material savings provided by truss foundations.

To that end, it is an object of some embodiments of the disclosure to provide systems, methods, and machines for automatically aligning a screw anchor driving machine to drive screw anchors along an intended drive axis. It is a further object of other embodiments of the invention to provide systems, method, and machines for automatically orienting an alignment jig to enable a truss foundation to be assembled so that the rotational axis of the single-axis tracker is aligned with respect to a predetermined point in space. These and other objects, features and advantages of the present disclosure will become apparent from the following detailed description of illustrative embodiments thereof, which is to be read in connection with the accompanying drawings.

DETAILED DESCRIPTION

The following description is intended to convey a thorough understanding of the embodiments described by providing a number of specific embodiments and details involving A-frame-shaped truss foundations supporting single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1A:
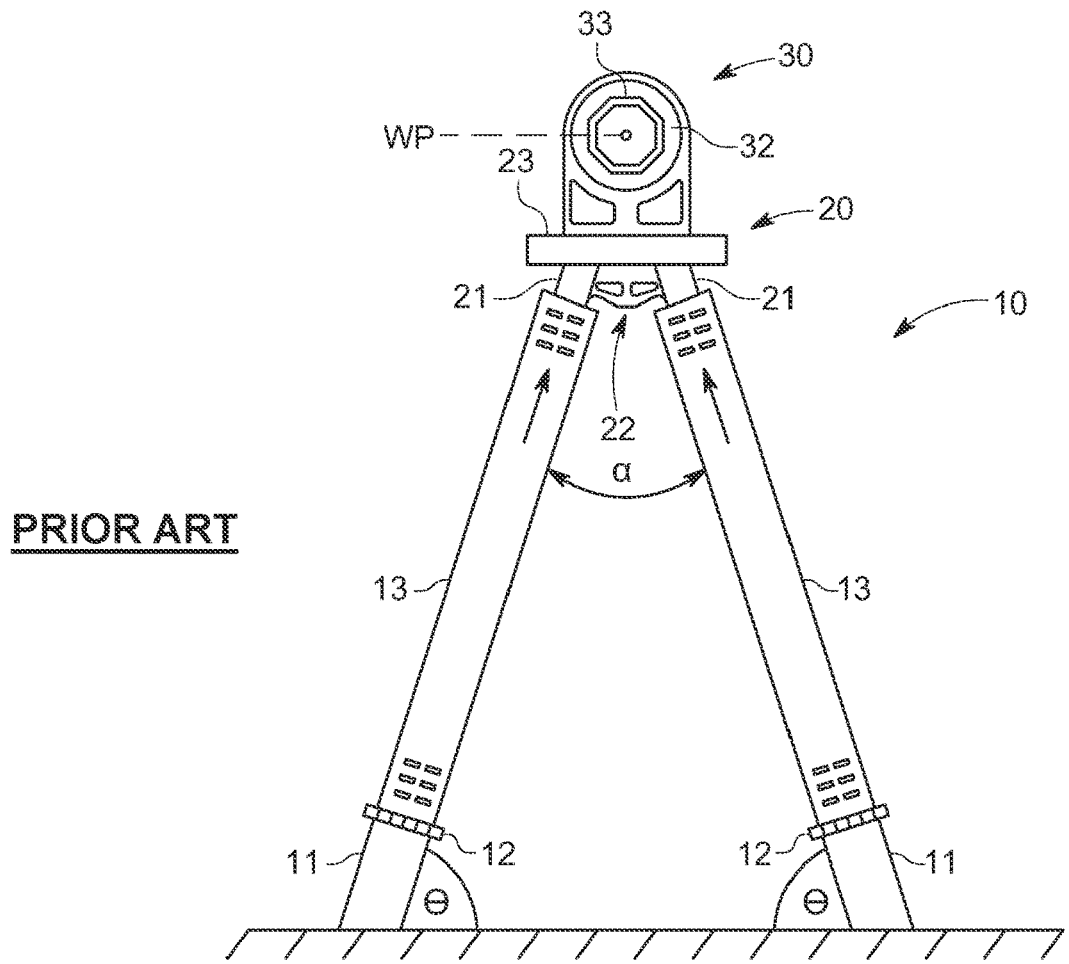
FIG. 1A shows a prior art truss foundation supporting a portion of a single-axis tracker.
Figure 1B:
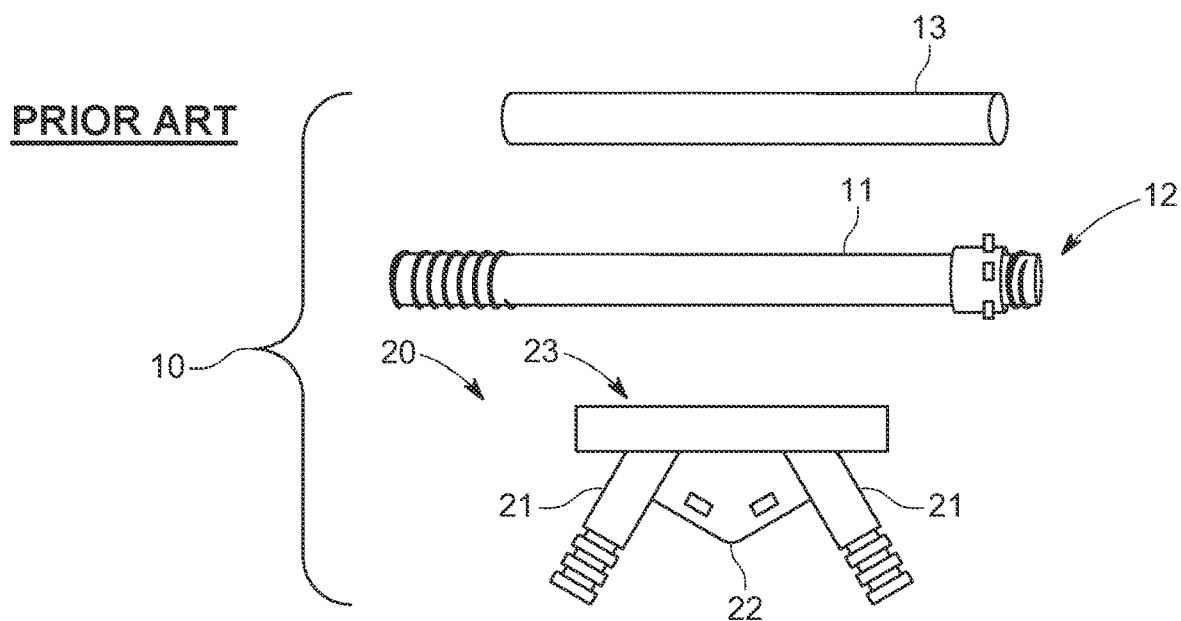
FIG. 1B shows the components of the truss foundation shown in FIG. 1A.

Turning now to the figures, where like elements are designated with like numbers, FIG. 1A shows truss foundation 10 supporting a portion of an exemplary single-axis tracker. FIG. 1B shows the elements of truss foundation 10 in FIG. 1A as individual components. The tracker shown here is a conventional bottom-up type tracker where the torque tube is supported in a series of bearings that enable it to rotate about its own axis. Although this design is employed by many tracker makers, the one shown in FIG. 1A approximates the torque tube and bearing assembly of the DuraTrack HZ single-axis tracker manufactured and sold by Array Technologies, Inc. of Albuquerque, N. Mex. As discussed in the context of FIG. 2A, truss foundation 10 may also support a top-down style of tracker where the torque tube is suspended from a bearing pin and instead swings through an arc about the pin.

Truss foundation 10 consists of a pair of adjacent angled truss legs whose above-ground ends are joined by adapter 20. The truss legs are moderately angled with respect to the ground by an angle θ that may range from 55-degrees up to 72.5-degrees corresponding to a separation angle between the legs a in range of 70-degrees down to 35-degrees. Each truss leg consists of screw anchor portion 11 extending below ground, a driving coupler 12 at the upper end of each screw anchor 11, and an upper leg portion 13 that attaches to one of screw anchors 11 via driving coupler 12. Though not shown in the figure, screw anchor 11 may have an external thread form at its lower end and may extend several feet into the underlying ground. In various embodiments a crimper may be used to compress upper legs 13 around couplers 12 to unify the truss, however, other types of mechanical fasteners may also be used.

Adapter or bearing support 20 is shown as a unitary structure with connecting portions 21 that extend down and into the top end of each upper leg 13. Connecting portions 21 may also be secured to the leg with a crimp connection by placing a crimping drive over the portion of each upper leg 13 covering one of the connecting portions 21. Adapter 20 may have a brace or gusset plate 22 that provides additional support. As shown in FIGS. 1A and 1B, exemplary tracker bearing assembly 30 includes a main body portion that sits on and is attached to support surface 23 of bearing support 20 via a pair of bolts or other suitable mechanical fasteners. Torque tube 33 is centered within bearing 30 via bearing insert 32. Bearing insert 32 enables the torque tube to have a more rigid faceted geometry and still fit within the circular bearing opening of bearing assembly 30. It also prevents metal-to-metal contact within the bearing. In real-world conditions, a single tracker row may extend over 300-feet and include foundations such as truss foundation 10 every 20-30 feet.

In the example of FIG. 1A, the rotational axis of the tracker, the center of torque tube 33, is positioned at the work point of truss 10. This is shown by the arrows through the center of each upper leg portion 13 that point directly at the center of torque tube 33. As discussed herein, by aligning the tracker's rotational axis with the work point of each truss, lateral loads are maximally converted into axial forces of tension and compression in the truss legs. However, as discussed in greater detail in the context of related U.S. patent application Ser. No. 16/824,550 (the '550 application), alignment of the rotational axis with the work point may not be advantageous for foundations that must also resist moments in addition to lateral loads. In such cases, it may be preferred to offset the rotational axis below the truss work point. The disclosure of the '550 application is hereby incorporated by reference in its entirety. The various principles disclosed herein are equally relevant to applications where the rotational axis must be aligned with the work point as well as ones where the rotational axis must be aligned to a point in space that may be offset from the truss work point.

FIG. 1B shows the individual components making up exemplary truss foundation 10. The base component is screw anchor 11. Screw anchor 11 is a section of substantially uniform diameter, open pipe of precut length (e.g., 1-meter) that has an external thread form beginning at the lower end extending up a portion of the shaft and driving coupler 12 fixed at the opposing end. Driving coupler 12 may be a separate cast piece that is welded or otherwise attached to the upper end of screw anchor 11. In various embodiments, it is engaged by a chuck of a screw anchor driving machine so that torque and down force may be transferred to anchor 11 to drive it into underlying ground. Also, driving coupler 12 provides an attachment point for upper leg portion 13. In various embodiment, an upper leg 13 is sleeved over coupler 12 until it rests on the driving features which, as shown in FIG. 1B, have a larger diameter than the rest of the coupler. They act as stop to limit the extent of penetration of the coupler into the upper leg. The apex component of truss foundation 10 that joins the free ends of each upper leg 13 is bearing support or adapter 20. Bearing support 20 has connecting portions 21 that extend away at angles that match the intended angles of each truss leg.

In various embodiments, and as discussed in greater detail herein, truss 10 is assembled by driving a pair of screw anchors into the ground at angles to one another to point at a common point in space, such as the work point of the truss. Then, bearing support 20 is held in place by a jig on a mast of the anchor driving machine at the orientation that aligns with other bearing supports in the same row. An operator may then sleeve an upper leg over each connecting portion 21 of bearing support 20 until there is sufficient clearance to sleeve back down over one of the respective couplers 12. In various embodiments, the overlap between connecting portions 21 and upper legs 13 and between upper legs 13 and couplers 12 is intentionally sloppy to allow for some misalignment between the drive axis of screw anchors 11 and their intended drive access prior to crimping so that bearing support 20 will support the tracker's rotational axis at the desired point in space. In various embodiments, a crimper is used at the four connection points to unify the truss foundation at the proper orientation, thereby removing the slop.

Figure 2A:
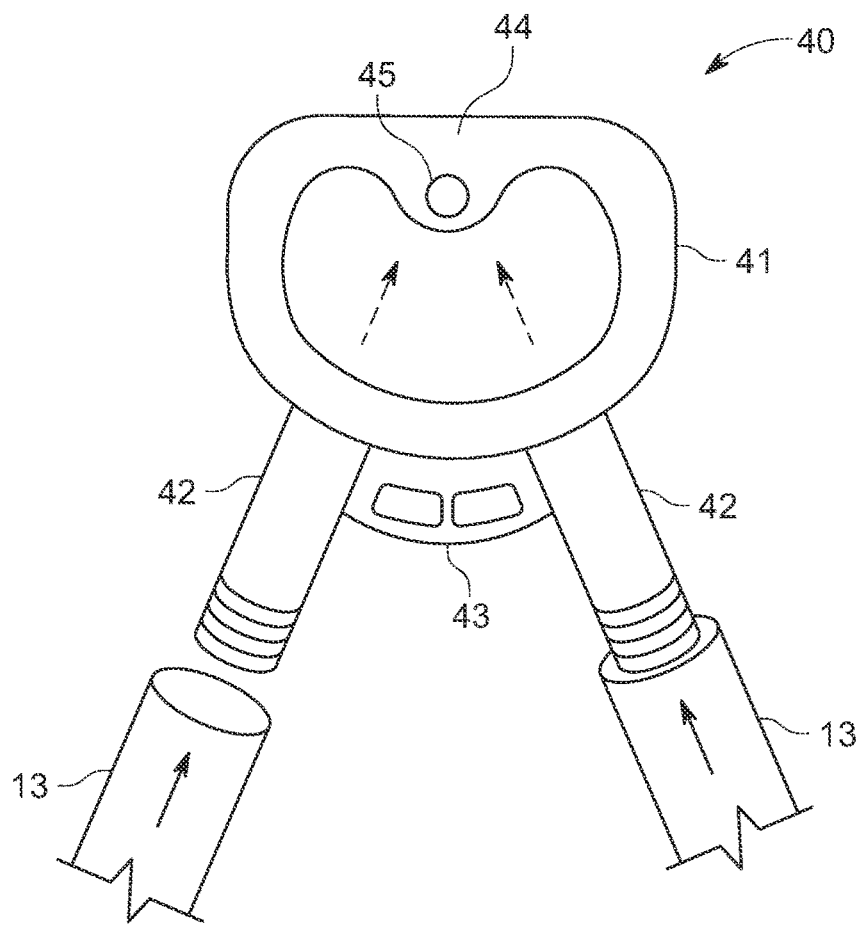
FIG. 2A shows a bearing adapter according to various exemplary embodiments usable with a truss foundation such as that as shown in 1A.

Turning now to FIG. 2A, this figure shows a portion of a truss foundation supporting a portion of another single-axis tracker. In this case, the single-axis tracker is a mechanically balanced top-down style tracker such as the NX series of single-axis trackers manufactured and sold by NEXTracker Inc., of Fremont, Calif. Although the actual tracker is not shown in the figure, in such a tracker the torque tube hangs from a bearing pin above it rather than rotating with a bearing about its own axis. To accomplish this, the drive motor is offset from the rest of the torque tube to be axially aligned with the bearing pin rather than the torque tube so that as the motor turns, the tube swings through an arc about the pin. In this example, the truss apex hardware used to support such a tracker may combine bearing and support function into a single structure designated herein as a bearing adapter. Bearing adapter 40 joins the free ends of upper legs 13 to complete the A-frame-shaped truss, enabling lateral and vertical loads to be resisted in the legs as axial forces of tension and compression, and it aligns the tracker's axis of rotation, in this case, the bearing pin, with the work point of the truss. Adapter 40 also limits the extent of the arc the torque tube can swing in both the East and West directions to resist unintended movement due to external forces.

Other than replacing bearing support 20 with bearing adapter 40, the foundation supporting the single-axis tracker in FIG. 2A is essentially the same as that shown in the context of FIGS. 1A and B. Each truss leg consists of upper leg portion 13 joined to the top end of screw anchor 11 via driving couplers 12. Bearing adapter 40 joins the truss legs to form a unitary A-frame-shaped truss but also provides the features of the NEXTracker bearing house assembly (BHA) shown with dotted lines FIG. 2B. As shown, bearing adapter 40 has a cardioid-shaped frame 41 with a pair of connecting portions 42 extending below into each upper leg 13. Cardioid-shaped frame 41 also has a cusp portion 44 that includes bearing 45. In the NEXTracker ecosystem, a bearing pin sits in the bearing and one or more torque tube brackets suspend the torque tube from the bearing pin. Therefore, the rotational axis is not the torque tube itself but rather the bearing pin. Cardioid-shaped frame 41 has a pair of opposing lobes that provide clearance for the torque tube to swing through its arc as the panels are moved from East-facing to West-facing each day. Gusset plate 43 between connecting portions 42 provides additional rigidity to frame 41.

As seen in FIG. 2A, even though the torque tube rotates about a bearing pin seated in bearing 45, the truss legs still point at the truss work point, in this case the center of bearing 45. In such a system, the bearing does not resist rotation of the tracker and therefore the bearing adapter 40 provides a largely non-moment connection to the tracker. The only exception is that when the tracker is at the maximum tilt angle (typically 55 to 60-degrees), any additional external forces may cause the torque tube to contact and bear against the inside surface of one of the lobes of cardioid-shaped frame 41. This will impart some moment to the truss foundation. Otherwise, such external forces are resisted only at the foundation supporting the drive motor.

A truss foundation using bearing adapter 40 is assembled in the same way as discussed above in the context of the foundation shown in FIGS. 1A and B. After each screw anchor is driven into the ground along its intended axis, bearing adapter 40 is held by an alignment jig on the installation and assembly machine so that the bearing is aligned with other bearings in the row (e.g., along the Y-axis, Z-axis, and in pitch, roll and yaw). If the rotational axis is to be aligned with the truss work point, a design parameter that will be known beforehand, the jig will hold the adapter 40 so that its bearing is at that position. Otherwise, if it is to be offset, it will hold it a fixed distance from a predetermined point in space.

Figure 2B:
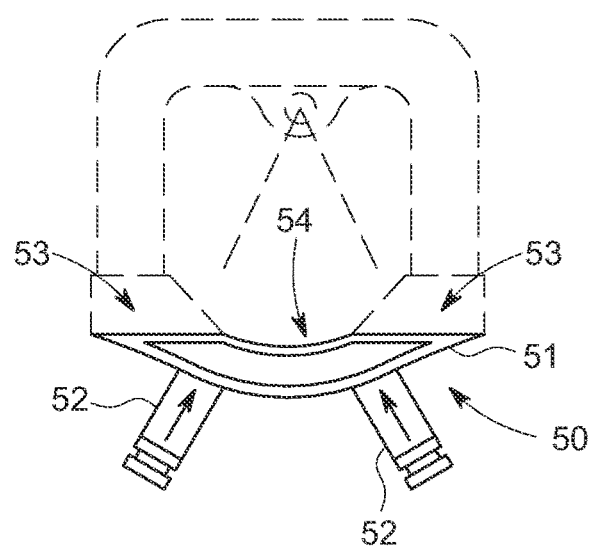
FIG. 2B shows a bearing support according to various exemplary embodiments usable with a truss foundation such as that shown in 1A.

FIG. 2B shows bearing support or adapter 50 according to various other embodiments of the invention. Like bearing adapter 40, bearing support 50 is also designed to work with a top-down tracker system, however, this component relies on the tracker maker's bearing housing assembly (BHA) rather than incorporating the function of the bearing into the bearing support. Support 50 has a main body portion 51 with a pair of connecting portions 52 extending below and away from main body 51. Like those on bearing adapter 40, these connecting portions are received in respective upper legs to complete the truss. The upper side of support 50 has a pair of pedestal portions 53 that support the legs of the NEXTracker bearing housing assembly (BHA), obviating the need for the right-angle brackets used to support such a tracker with a conventional H-pile. Between pedestal portions 53 is a recessed portion 54. In various embodiments, recessed portion 54 may assist installation by allowing torque tube sections to be placed on bearing support 50 while the BHAs are attached to the torque tube. As with bearing adapter 40, support 50 is dimensioned so that connecting portions 52 match the angle of the truss legs and also enables the legs, once connected to point at the work point of the truss, in this case, the bearing formed in the NEXTracker BHA. Because bearing support 50 does not have a bearing but rather is offset from the bearing by a known offset, depending on the tracker manufacturer, the alignment jig on the machine mast will hold bearing support 50 so that it is centered about the work point and at a known distance below the work point so that when the NEXTracker bearing housing assembly is attached to the top of bearing support 50, the bearing that receives the bearing pin will be aligned with the truss work point.

Figure 3A:
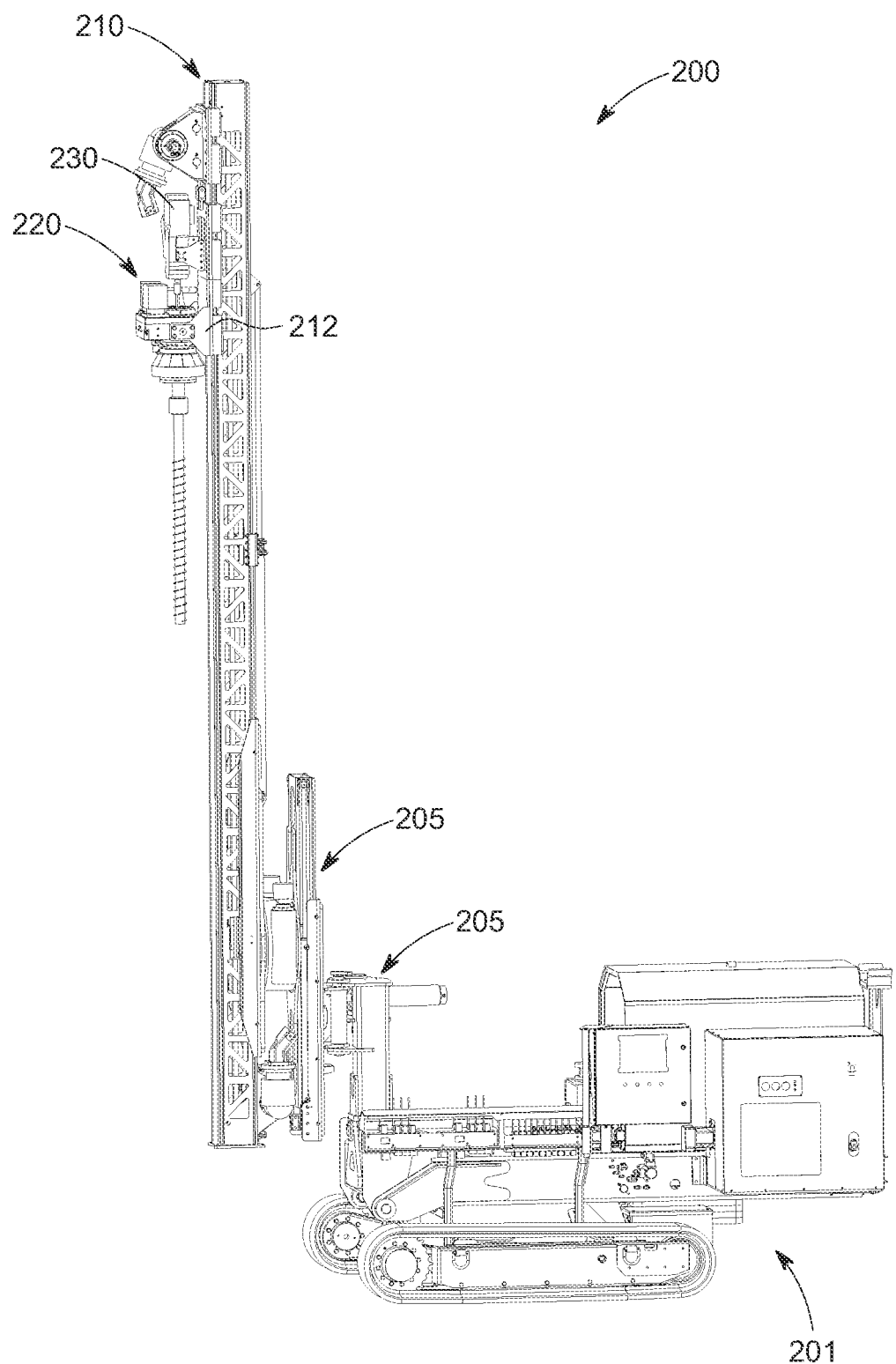
FIG. 3A shows a side view of a machine for installing and assembling truss foundation components according to various embodiments.
Figure 3B:
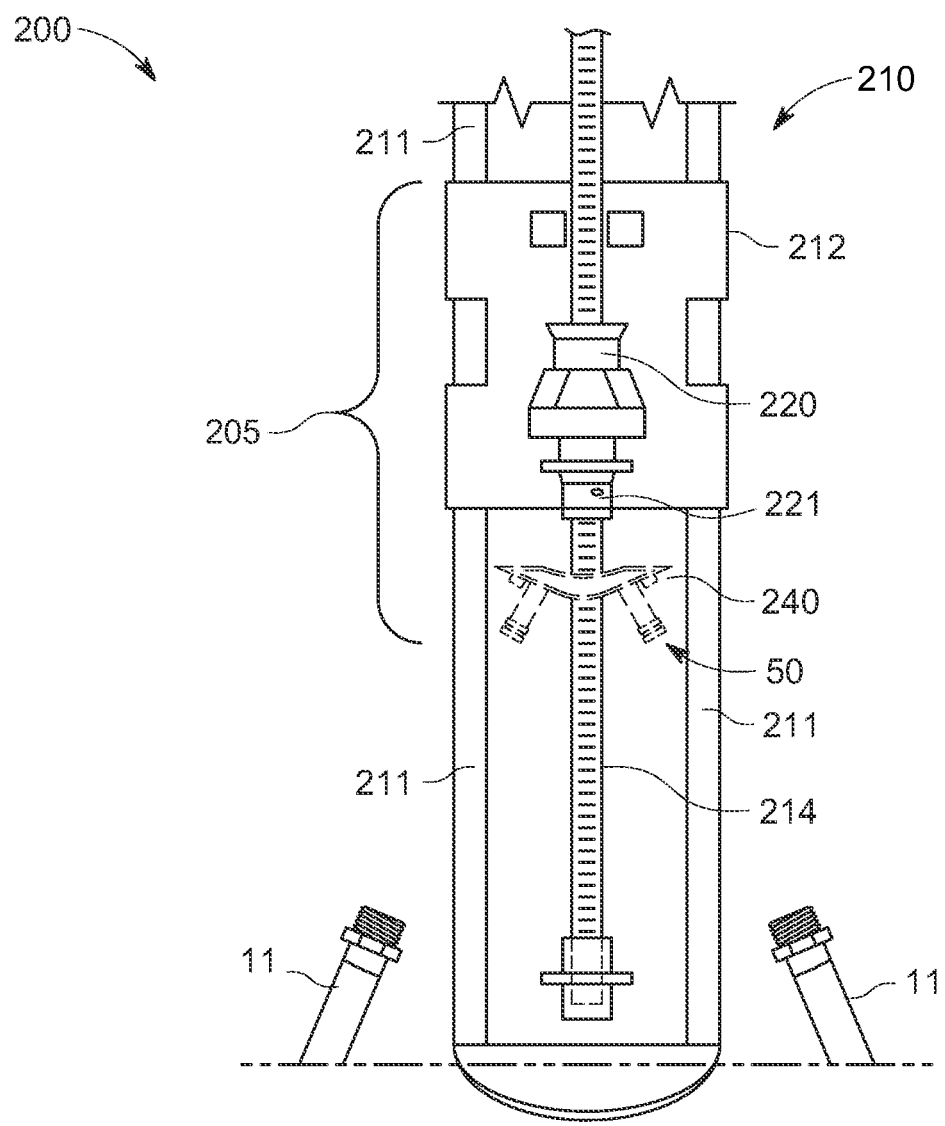
FIG. 3B shows a mast view of a portion of the machine for installing and assembling truss foundation components according to various embodiments.

FIG. 3A shows a machine for driving and assembling truss foundations according to various embodiments of the invention; FIG. 3B is a close-up view looking at a portion of the machine mast. As shown in the example of the figures, machine 200 is a piece of heavy equipment riding on tracked chassis 201. Articulating mast 210 is connected to tracked chassis 201 via mechanical interface 205 consisting of multiple hydraulic actuators, slides, trunnions, etc., and corresponding motion controllers that effect movement of the mast with up to six degrees of freedom with respect to machine 200 via these elements. As shown, mast 210 is an elongated boxed or beam-like structure that extends far above machine 201. In various embodiments, mechanical interface 205 enables the machine to move with respect to the machine at least in Z, Y, pitch, roll and yaw and also, in some embodiments, X, to enable the mast and its corresponding screw anchor driving axis to be aligned with the desired location of truss foundation components to insure that each truss foundation in a given tracker row supports the torque tube at the desired orientation. On level ground, this may mean supporting it to be level and at the same height. On contoured terrain, this may mean remaining orthogonal to the torque tube and maintaining the tube along a continuous straight axis.

Turning to 3B, mast 210 has a pair of parallel tracks or rails 211 running substantially the entire length on either side. Lower crowd or carriage 212 rides along tracks 211 to move up and down mast 210 motivated by chain 214 that is attached to a lower crowd motor or other suitable power source (not shown). In various embodiments, the lower crowd motor may be located behind the mast (i.e., on the side of the mast facing the machine) or otherwise concealed within the mast so as not to interfere with the movement of lower crowd 212 along the mast. In various embodiments, and as shown in the drawings, rotary driver 220 is attached to lower crowd 212. Rotary driver 220 may be hydraulically powered unit with an output chuck 221 that receives a driving collar of a screw anchor and transfers torque to the anchor via the chuck to rotate it into the ground. In various embodiments, at the same time as rotary driver 220 applies torque, the lower crowd motor pulls on chain 214 to transfer downforce to the screw anchor via lower crowd 212 since rotary driver 220 is attached to it. In various embodiments, the combination of torque and downforce are optimized via automated closed-loop feedback control to drive screw anchors into underlying ground without augering the soil.

Though not shown in the detail of 3B, tool driver 230, such as a hydraulic drifter or other drilling tool, may also be positioned on mast 210 on a separate upper crowd or carriage so that its shaft passes through rotary driver 220 as well as through an attached screw anchor when driving. In various embodiments, this upper crowd or carriage is also coupled to chain 214 and therefore movable up and down mast 210 by the lower crowd motor at the same rate as lower crowd 212. However, unlike lower crowd 212, in various embodiments, the upper crowd is selectively detachable from chain 214 and movable by a separate drift motor that enables the hydraulic drifter to the tool shaft to move at a different feed and speed than the feed and speed of rotary driver 220.

As seen in FIG. 3B, in various embodiments, lower crowd 212 or mast 210 may include one or more alignment jigs 240 that may be used during assembly of the truss foundation to hold the bearing support at the proper orientation, that is so that when a BHA or bearing assembly are attached, the rotational axis of the BHA or bearing assembly will pass through the work point of the truss. In this figure, alignment jigs 240 are shown as projections, however, it should be appreciated that one or pins, clamps or other structures may be used to hold the bearing support or bearing adapter in place. As discussed in greater detail in the context of the remaining figures, in various embodiments, a controller that controls the orientation of the mast is programmed to automatically position the lower crowd and/or mast 210 so that the alignment jigs 240 will position the bearing support or bearing adapter at the correct location to be consistent with the site design and other foundations in the same row. Rotary driver 220 must extend down below the lower end of lower crowd 212 so that the rotary driver can extend sufficiently far down to drive screw anchors into the ground, however, it needs to be out of the way when assembly the truss. In various embodiments, alignment jig 240 may be on a removable assembly that can be selectively attached and removed from lower crowd 212.

Figure 4:
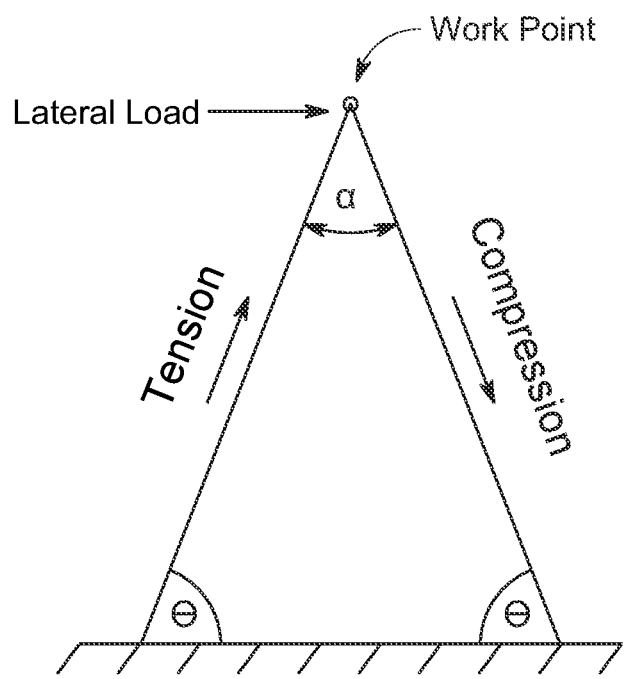
FIG. 4 is a force diagram showing how lateral loads are translated in a truss foundation.

Turning now to FIG. 4, this figure is a force diagram showing how lateral loads from wind striking the array are translated into the legs of a truss foundation. Regardless of foundation type, in a single-axis tracker, lateral loads are translated into the foundation via the rotational axis of the system (i.e., the point that the rotating parts rotate about or within). In most single-axis tracker systems, where a torque tube is captured within a circular bearing, the torque tube itself defines the axis of rotation. Lateral forces are transferred to the foundation directly via the bearing assembly surrounding the tube. However, as discussed in the context of FIGS. 2A, in the NEXTRACKER single-axis tracker, the torque tube is offset from the axis of rotation. The tube is attached to a tube clamp that hangs from a hinge point formed in a torque tube clamp support. As a result, the axis of rotation is the bearing pin, not the tube itself. When a single-axis tracker is supported by a truss foundation at a point that primarily resists lateral loads, as opposed to bending moments, the axis about which rotation occurs should ideally pass through the truss work point to enable the lateral load to translate into axial forces of tension and compression in the legs. Individual structural members are good at resisting axial forces relative to their ability to resist bending, therefore, the truss offers an advantage relative to single H-piles. In the line diagram of FIG. 4, the work point is the intersection of an imaginary line extending through the center of mass of each leg. However, achieving that may be more complicated with a truss foundation than with a single plumb-driven H-pile because there are more components that can contribute to misalignment. Therefore, the portion of the A-frame legs extending into the ground must be driven with the work point in mind so that each leg points at a common work point. If so, a line extending through each leg's center of mass will extend to a common above-ground intersection point or three-dimensional area in free space. In the case of a bottom-up tracker where the torque tube rotates about its own axis, at non-moment connection points, the torque tube should pass through the work point for each A-frame or truss foundation supporting it. In the case of a top-down or mechanically balanced tracker, the axis of the bearing pin about which the torque tube rotates should pass through work point and should be oriented the same as other bearings in the same tracker row.

Figure 5:
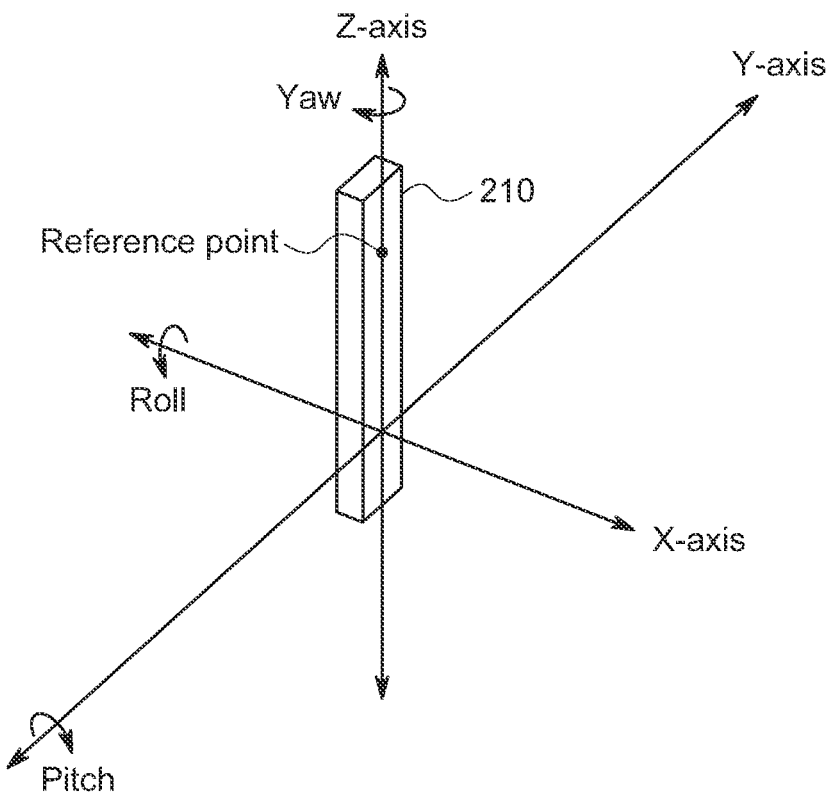
FIG. 5 is a coordinate system showing the axes of drive axis alignment for a truss installation and assembly machine according to various embodiments of the invention.
Figure 6:
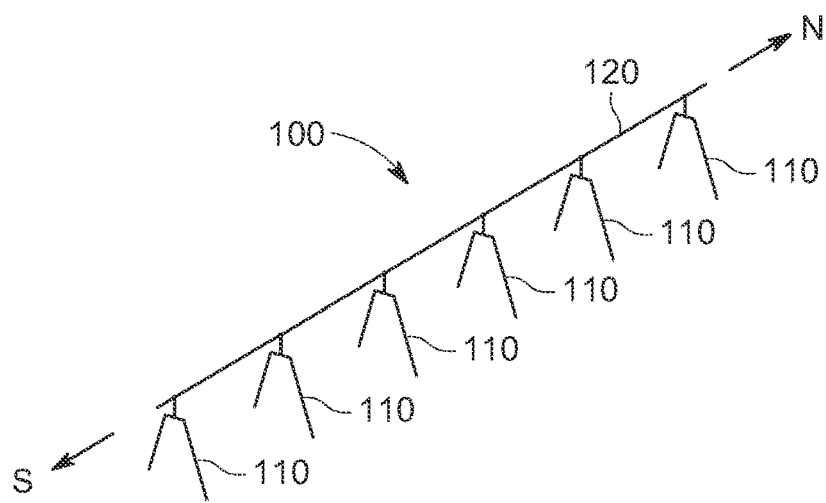
FIG. 6 is a line diagram showing portions of a single-axis tracker supported by truss foundations.

FIG. 5 shows a coordinate system around a machine mast to illustrate the required articulation to align the masts drive axis with an intended drive axis for the current screw anchor. At each foundation site, that is, position along the North-South row of the tracker designated as the X-axis in the figure, the X-axis location is known in advance based on the requirements of the tracker and the site plan. Pitch and roll are dictated by the contour of the land and the requirement of orthogonality to the rotational axis, if present. After the machine is positioned to a location where a truss foundation is to be installed on the X-axis, the mast must be aligned with respect to the Y and Z axes as well as aligned in pitch, roll and yaw, to be consistent with other foundations in the row and/or to maintain orthogonality to the tracker's rotational axis. FIG. 6 shows a portion of a single-axis tracker 100 supported by truss foundations where the foundations are shown as line diagrams. The figure shows the required symmetry from foundation to foundation where the plane defined by each truss foundation 110 is parallel to each other foundation and is orthogonal to torque tube 120. Assuming a straight torque tube, this requires the bearings to be aligned in multiple axes to avoid putting stress on the torque tube. Therefore, in various embodiments, the machine may determine an initial location and orientation of the mast, or a point or axis of the mast within a coordinate system, such as that shown in FIG. 5. A programmable logic controller (PLC) or other microcontroller may then compare this to an intended drive axis and control one or more motion controllers effecting motion of the mast to align the mast's drive axis with an intended drive axis for the current foundation.

Figure 7:
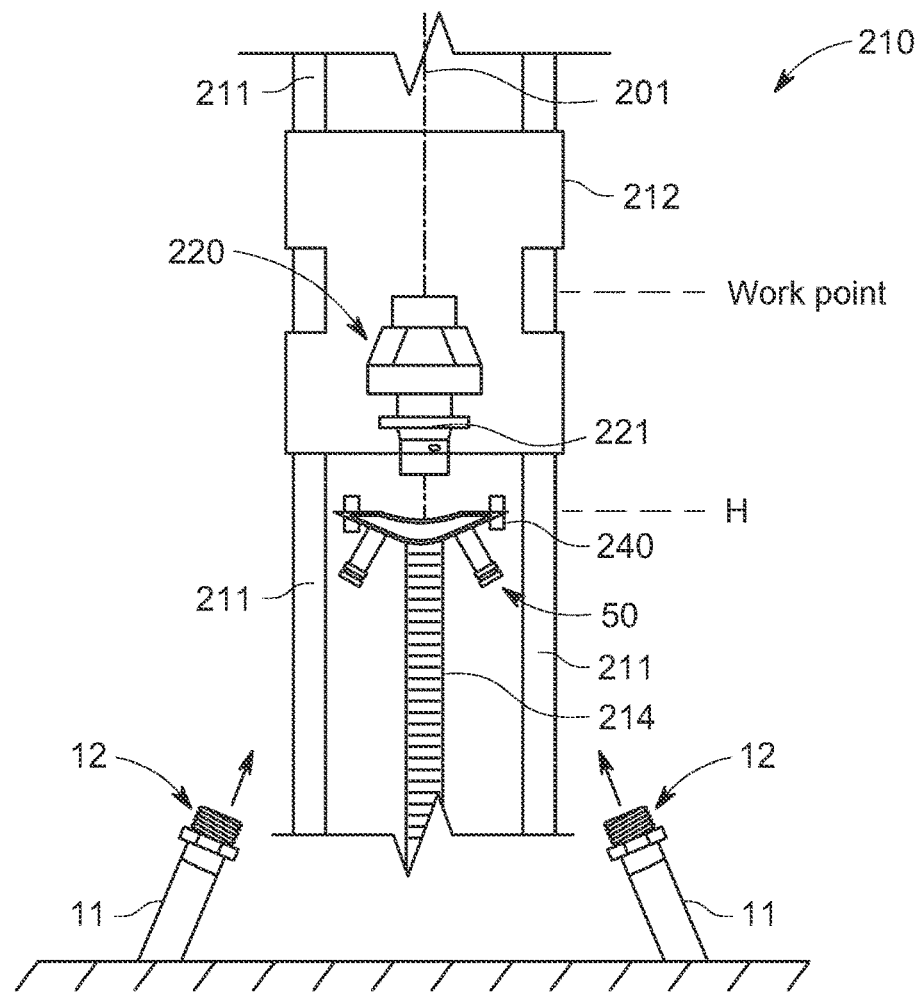
FIG. 7 shows a portion of a machine mast for installing and assembling truss foundations according to various embodiments of the invention.

The first step of achieving foundation alignment is driving the screw anchors that make up the base of the foundation along their intended axis, that is, at the angle and orientation required to consistently support the rotational axis of the tracker, torque tube or bearing pin, such as, for example, at the truss work point. In some cases, the drive axis may become misaligned from the intended axis due in part to changes in soil density, mast movement, etc. In recognition of this, in various embodiments of the invention, after the pair of adjacent screw anchors have been driven, the microcontroller will cause the mast to orient to an alignment position where a jig on the mast is positioned with respect to a predetermined point in space, such as the truss work point, so that the truss can be assembled to insure that the bearing will be located at the intended position, and misalignment of one or both screw anchors may be effectively corrected. To that end, FIG. 7 is a partial front view of machine mast 210 after screw anchors 11 have been driven.

In various embodiments, the controller controlling movement of the mast will cause mast 210 to raise alignment jig portion 240 so that it holds bearing support 50 at respective Y, Z, pitch, roll and yaw orientations that will result in the BHA's bearing being aligned with other bearings in the row when attached to bearing support 50. In various embodiments, if the bearing is to be aligned with the work point, the midline distance from support 50 to the bearing will be known in advance. Therefore, the controller can control the mast to elevate alignment jig portion 240 and by extension, bearing support 50 to a height H that will result in the bearing being aligned. An operator may then sleeve an upper leg over one of the connector portions 52 of bearing support 50 and then drop it down over the top of driving coupler 12. The process is repeated for the second leg. Intentional slop at the connection points between upper legs 13 and connection portions 52 and couplers 12 will correct for misalignment between the anchors intended and actual drive axes. With bearing support 50 held securely in place by alignment jig portion 240, the connections may be crimped with an external crimping device to preserve the proper orientation.

Figure 8:
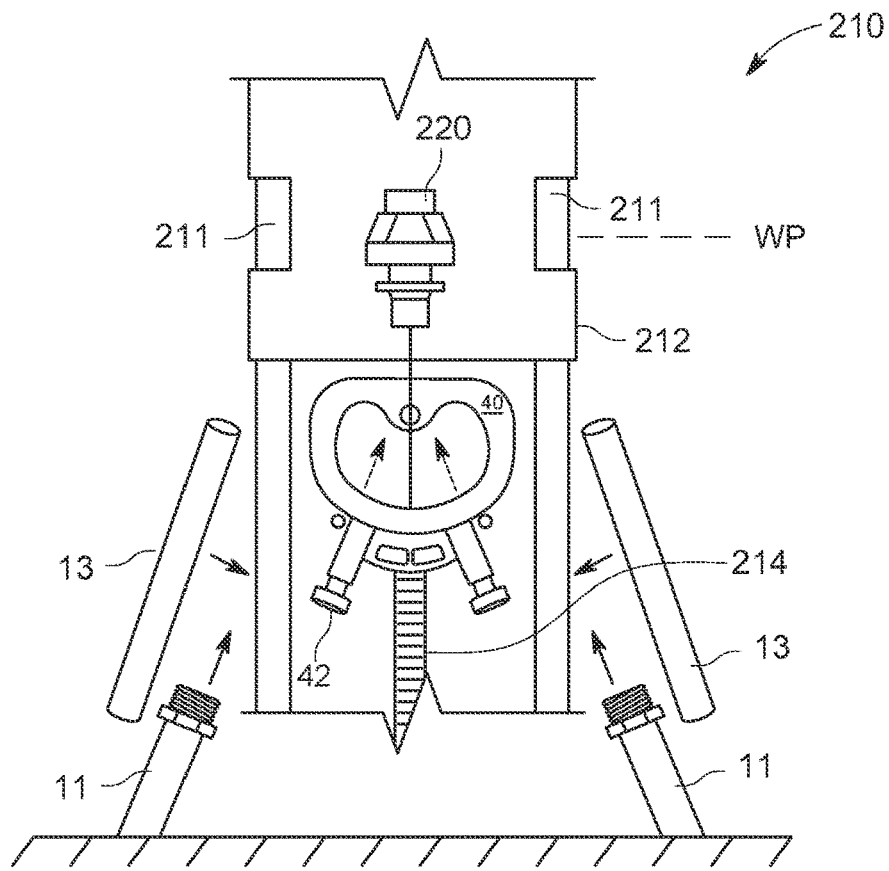
FIG. 8 shows a portion of a machine mast for installing and assembling truss foundations according to various other embodiments of the invention.

Turning now to FIG. 8, this figure is another partial front view of machine mast 210 after screw anchor anchors 11 have been driven. In this example, bearing adapter 40 is used instead of bearing support 50. Assuming intended alignment of the tracker's rotational axis with the truss work point, the controller may control one or more motion controllers to orient alignment jig portion 240 to support bearing adapter 40 so that its bearing aligns with the truss work point. With bearing adapter 40 in place, upper legs 13 may be sleeved over respective connection portions 42 and then dropped down onto driving couplers 12 to complete the truss. A crimper may once again be used at the four interconnection points to lock the truss geometry in place before moving the machine and mast to the next foundation location.

Figure 9:
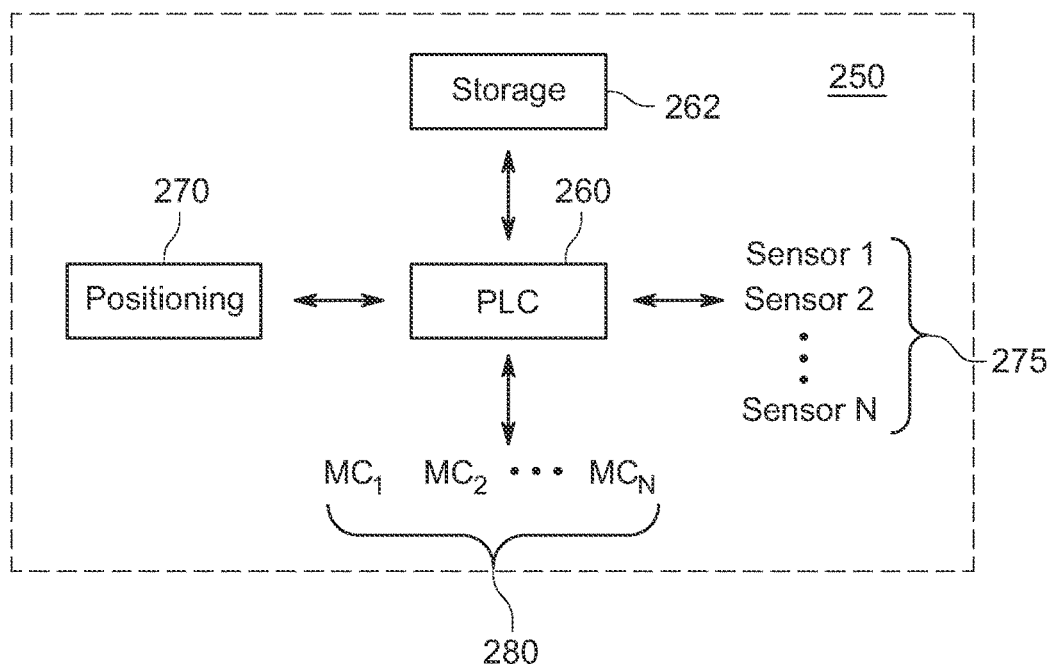
FIG. 9 is a system diagram showing components of an automated system for aligning a drive axis of a machine mast with an intended drive axis according to various embodiments of the invention.

FIG. 9 shows exemplary system 250 for automatically aligning a driving axis of a mast of a foundation component installation and assembly machine with a predetermined drive axis according to various embodiments. The boundaries of system 250 are virtual not physical. The dotted line around system 250 does not signify a physical arrangement but rather the logical relationship between system elements. The center of system 250 is programmable logic controller or PLC 260. This may be a standard programmable logic controller (PLC) or one of many commercially available microcontrollers. Storage unit 262 is communicatively coupled to PLC 260 through a wired or wireless communication interface. In various embodiments, PLC 260 will have its own internal non-volatile memory where it stores its control program, whereas storage unit 262 may be used to store site-specific inputs and outputs, such as, for example, the intended location of each foundation on a job site include the work point, rotational axis height, type of tracker to be installed, truss leg angle, etc. as well as information generated during use of the system.

Module 270 is a positioning subsystem. This may include one or more global or local positioning systems that receive signals from satellites and/or local sources. In various embodiments, positioning subsystem 270 generates position information that corresponds to one or more points on the mast so that PLC 260 is able to adjust the location and/or orientation of the mast's drive axis relative to an intended drive axis for the screw anchor currently being installed. In various embodiments, a plurality of sensors 275, labeled as $Sensor_1$-$Sensor_N$, where N is an integer greater than two, are distributed along the movable axes of the mast to measure and/or encode movement of the mast along these axes so that the distance traveled from a starting orientation can be monitored and controlled by PLC 260. In addition, system 250 includes a plurality of individual motion controllers $MC_1, MC_2, \ldots, MC_N$. In various embodiments, each motion controller (MC) is connected to one or more hydraulic actuators 280 to affect movements controlled by PLC 260. As discussed in greater detail in the context of the flow charts of FIGS. 10 and 11, the components of system 250 enable automated alignment of the mast with respect to a predetermined point in space so that anchors may be driven, and foundations assembled, in a consistent and repeatable manner.

Figure 10:
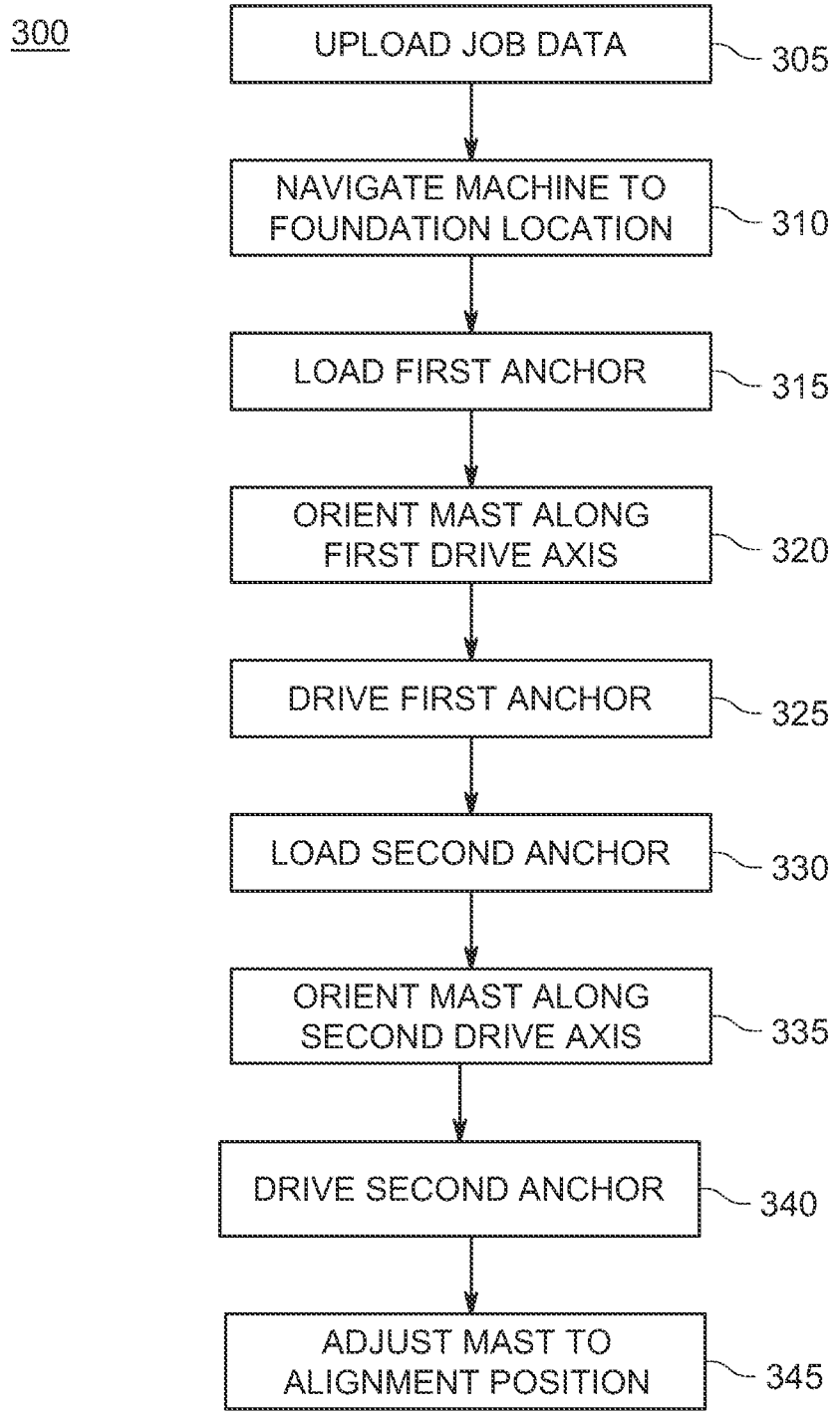
FIG. 10 is a flow chart detailing the steps of an automated method for truss installation and assembly according to various embodiments of the invention.

Turning now to FIG. 10, this figure is a flow chart detailing the steps of method 300 for truss alignment and assembly according to various embodiments of the invention. It should be appreciated that the specific order shown in the flow chart is not required and that in various embodiments, the steps may be performed in a different order. Also, in various embodiments, fewer or more steps may also be performed. The method begins in step 305 where jobsite data is uploaded to the machine. Jobsite data may include the location of each foundation on the array site, the work point height or each truss, the leg angle of each truss, as well as information specific to the type of tracker to be installed. As discussed in the context of FIG. 9, this information may reside in a storage unit communicatively coupled to the PLC. Jobsite data may be uploaded via a wired connection to an external device, from a USB or other format data drive or wirelessly transmitted to the machine. Then, in step 310, the machine is navigated to a foundation location, that is, a point along the intended North-South row of the tracker array where a truss foundation is to be installed. Navigation may be performed by an operator driving the machine along the tracker row, or alternatively, navigation may be performed automatically with and an automated navigation system capable of controlling the machine to move to each X-axis location along the North-South row based on stored information about the array.

In step 315, a first screw anchor is loaded onto the rotary driver of the machine mast. In various embodiments, after an operator presses a start button on the machine or on a remote controller for the machine, the controller causes the mast to rise vertically to enable a screw anchor to be loaded. After the anchor is loaded, the operator may push another button or execute another command to commence the driving operation for the first screw anchor. In various embodiments, in response to this, in step 320, the controller will determine the difference between a current orientation of the mast's drive axis, and a desired drive axis for the current foundation component or screw anchor. Once this has been determined, the controller will control required motion controllers to affect a change in the orientation of the mast's drive axis so that it matches the intended drive axis. This sub process is described in greater detail in the context of FIG. 11. In step 325, the first screw anchor is driven into underlying ground to the desired depth along the intended axis by applying torque with the rotary driver and downforce from the lower crowd. In various embodiments, the controller, in accordance with stored program data, will optimize the mix of torque and downforce to successfully drive the screw anchor as fast as possible without augering the soil or stalling.

When the anchor has reached the desired embedment depth, operation proceeds to step 330 where the controller causes the mast to level and to raise the lower crowd and by extension the rotary driver to the loading position so that an operator may load another screw anchor. This may happen automatically or in response to an operator command after the desired embedment depth is reached. Then, in step 335, the operator presses a button or otherwise issues a command to commence the driving operation for the second screw anchor. In response, the controller causes the mast to move from its current orientation to once again align its drive axis with the intended drive axis for the second screw anchor of the adjacent pair. Once aligned, operation proceeds to step 340 where the controller actuates the rotary driver and lower crowd to drive the second screw anchor. When the driving operation is complete, at step 345, the controller reverts the mast to a plumb orientation and raises the lower crowd to the alignment position for the particular tracker being installed so that a bearing support or bearing adapter can be attached to the alignment jig on the mast and the truss foundation constructed with the support or adapter at the correct position.

Figure 11:
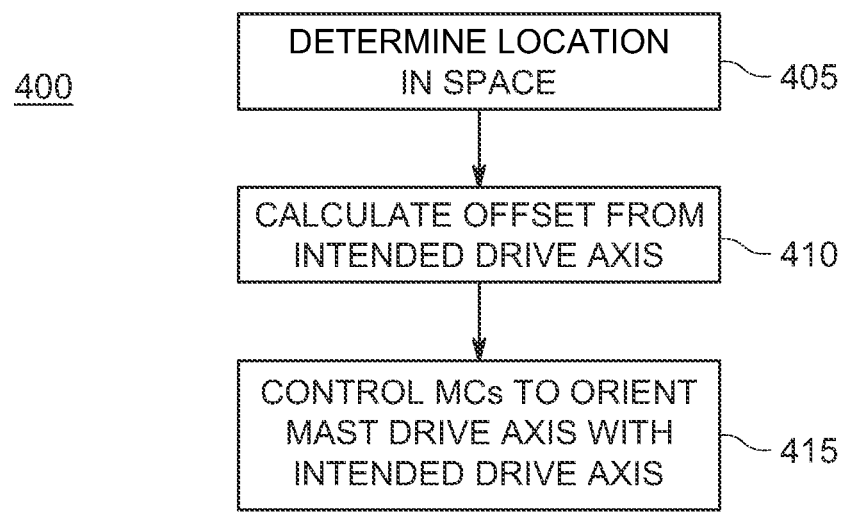
FIG. 11 is a flow chart detailing the steps of an automated method for aligning drive axis of a screw anchor driving machine with an intended drive axis so that the anchor points a predetermined point in space.

Turning to FIG. 11, figure is another flow chart detailing the steps of method 400 for automatically aligning a mast of a screw anchor driving machine with an intended truss leg axis so that the driven screw anchor points a predetermined point in space. The method begins in step 405 where the controller determines the location of the mast, or a point on or axis of the mast, within a coordinate system, such as the system shown in FIG. 5. As discussed herein, this step may be performed with a positioning system such as a GPS receiver or other global or local positioning system, or with a combination of two or more such systems. Once the controller receives the location information, in step 410, it is programmed to calculate the difference from its current orientation to the intended drive axis for the current anchor. The result of this calculation will be translated by the controller into a set of movements required by the mast to align its drive axis with the intended drive axis. In step 415, the controller issues commands to the individual motion controllers controlling the mast's actuators (hydraulic or electric), to use the available axes to align the mast. Alignment may be confirmed by repeating the location determining step 405 and confirming that the mast's linear drive axis is sufficiently aligned with the intended axis. Alternatively, alignment may simply be mathematically confirmed by measuring with linear and/or rotary encoders the movement of the machine from the initial reference location to its location after the mast's drive axis has been aligned with the intended drive axis.

Figure 12:
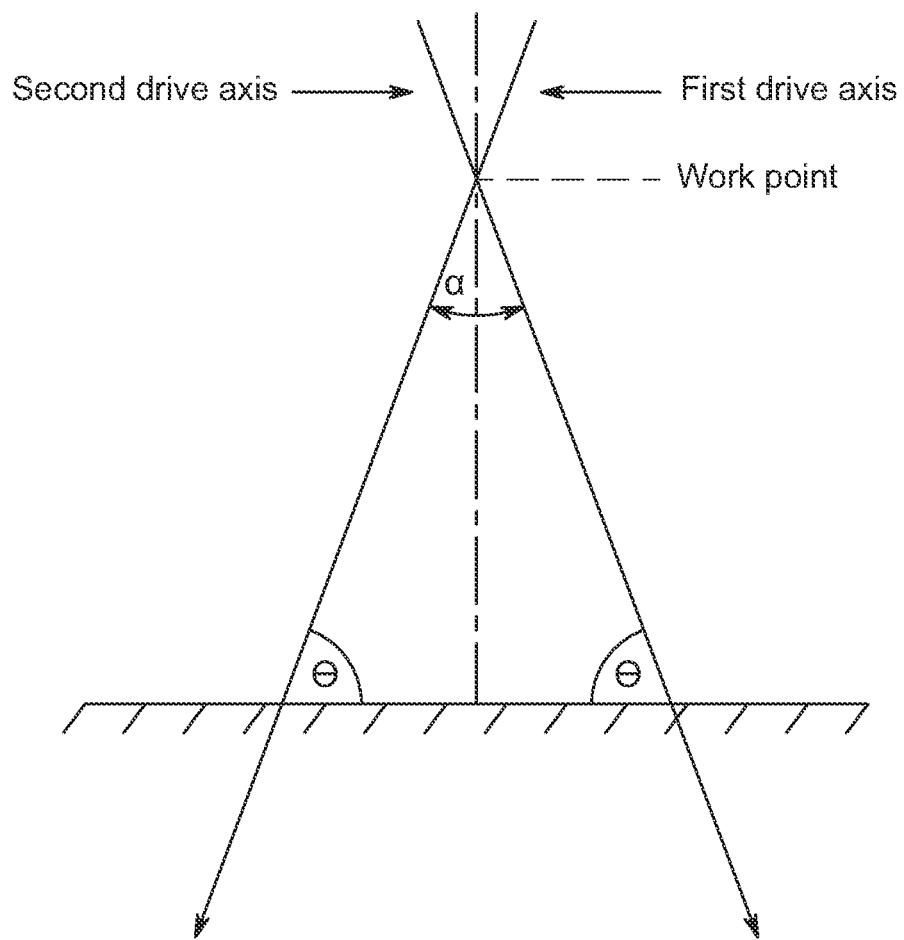
FIG. 12 is a line diagram showing a pair of intended drive axes for adjacent screw anchors according to various embodiments of the invention.

Turning now to FIG. 12, as seen in this figure, it is not required that a specific portion of the mast pass through the work point of the truss, but rather that the mast's drive axis overlaps with the intended first and second axes. In other words, in the simplest case, once the machine is properly oriented at the foundation location, it would be possible to drive a screw anchor, retract the upper crowd, rotate about the work point, and drive a second screw anchor. In a purely mechanically controller system, this may be required to insure that the first and second screw anchors point at a common work point. However, computerized control via the PLC enables a more robust approach where the rotational center of the mast need not be about the work point as long as the mast's drive axis lines up with either the first or second drive axis in the figure.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A machine for constructing and assembling solar tracker foundations comprising:
    an articulating mast having at least one rail extending along a length of the articulating mast;
    a rotary driver controllable to travel along the at least one rail to drive at least one first foundation component into underlying ground along a drive axis set by an orientation of the mast;
    at least one microcontroller programmed to control the articulating mast and rotary driver to orient the drive axis set by the orientation of the mast to be aligned with a desired drive axis and to drive the first foundation component into underlying ground along the desired drive axis; and
    an alignment jig for holding a second foundation component proximate to the at least one first foundation component and relative to a known position in a coordinate system to enable a third foundation component to interconnect the second foundation component to the first foundation component.

2. The system according to claim 1, wherein the second foundation component is a tracker bearing support.

3. The system according to claim 2, wherein the known position in a coordinate system corresponds to a location of an approximate center of a tracker torque tube above the tracker bearing support.

4. The system according to claim 1, wherein the at least one first foundation component is a screw anchor.

5. The system according to claim 1, wherein the at least one first foundation component is a helical anchor.

6. An automated system for constructing and assembling foundations for single-axis trackers comprising:
    an articulating mast connected to a mobile machine;
    a rotary driver positioned on the mast and controllable to travel along the mast to drive a first foundation component into underlying ground along a drive axis;
    a microcontroller connected to a plurality of motion controllers, the microcontroller programmed to control the plurality of motion controllers to align the drive axis with a desired drive axis and to control the rotary driver to drive the first foundation component along the desired drive axis; and
    an alignment jig positioned on the mast for holding a second foundation component above the first foundation component after the first foundation component is driven to enable a third foundation component to interconnect the second foundation component to the first foundation component.

7. The automated system according to claim 6, wherein the microcontroller is programmed to orient the alignment jig so that the second foundation component is positioned with respect to the first foundation component at a predetermined point in space.

8. The system according to claim 6, wherein the second foundation component is a tracker bearing support.

9. The system according to claim 6, wherein the second foundation component is a bearing adapter.

10. The system according to claim 7, wherein the predetermined point in space corresponds to an approximate center of a tracker torque tube that will be supported by the second foundation component.

11. An automated system for constructing foundations for single-axis trackers comprising:
    an articulating mast connected to a mobile machine;
    a rotary driver positioned on and operable to travel along a drive axis of the articulating mast;

a positioning system for locating the drive axis of the mast within a coordinate system;

a microcontroller connected to a plurality of motion controllers to effect movement of the articulating mast, wherein the microcontroller is programmed to control the plurality of motion controllers to orient the mast to align the drive axis of the mast with a desired drive axis and to control the rotary driver to drive a first foundation component into underlying ground along the desired drive axis; and an alignment jig positioned on the mast for holding a second foundation component at a position in the coordinate system with respect to the driven first foundation component at a predetermined point in space.

12. The system according to claim 11, wherein the microcontroller is programmed to automatically control the plurality of motion controllers to orient the alignment jig with respect to the first foundation component and the predetermined point in space to enable a third foundation component to interconnect the first foundation component to the second foundation component after the first foundation is driven.

13. The system according to claim 12, wherein the predetermined point in space is an approximate center of a tracker torque tube that will be supported by the second foundation component.

\* \* \* \* \*